Figure 1:
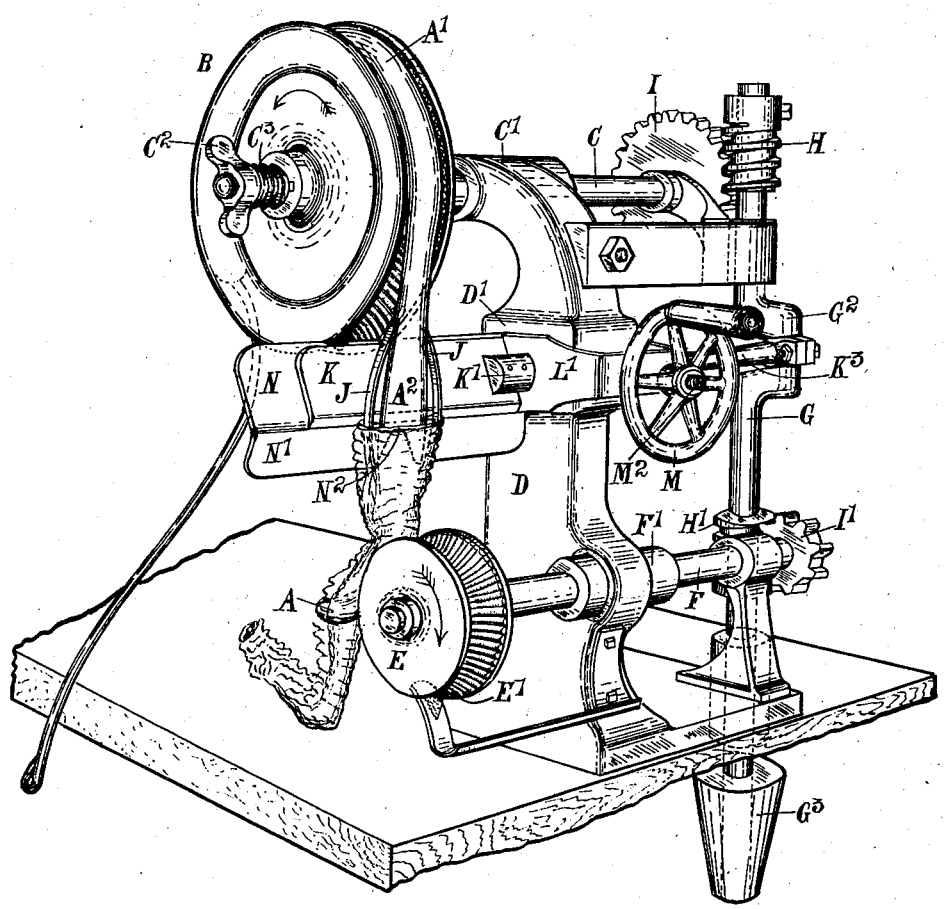

No. 744,712. PATENTED NOV. 24, 1903.
C. F. A. BITTERLING.
APPARATUS FOR DRESSING INTESTINAL SKINS.
APPLICATION FILED DEC. 13, 1902.
NO MODEL. 2 SHEETS—SHEET 1.

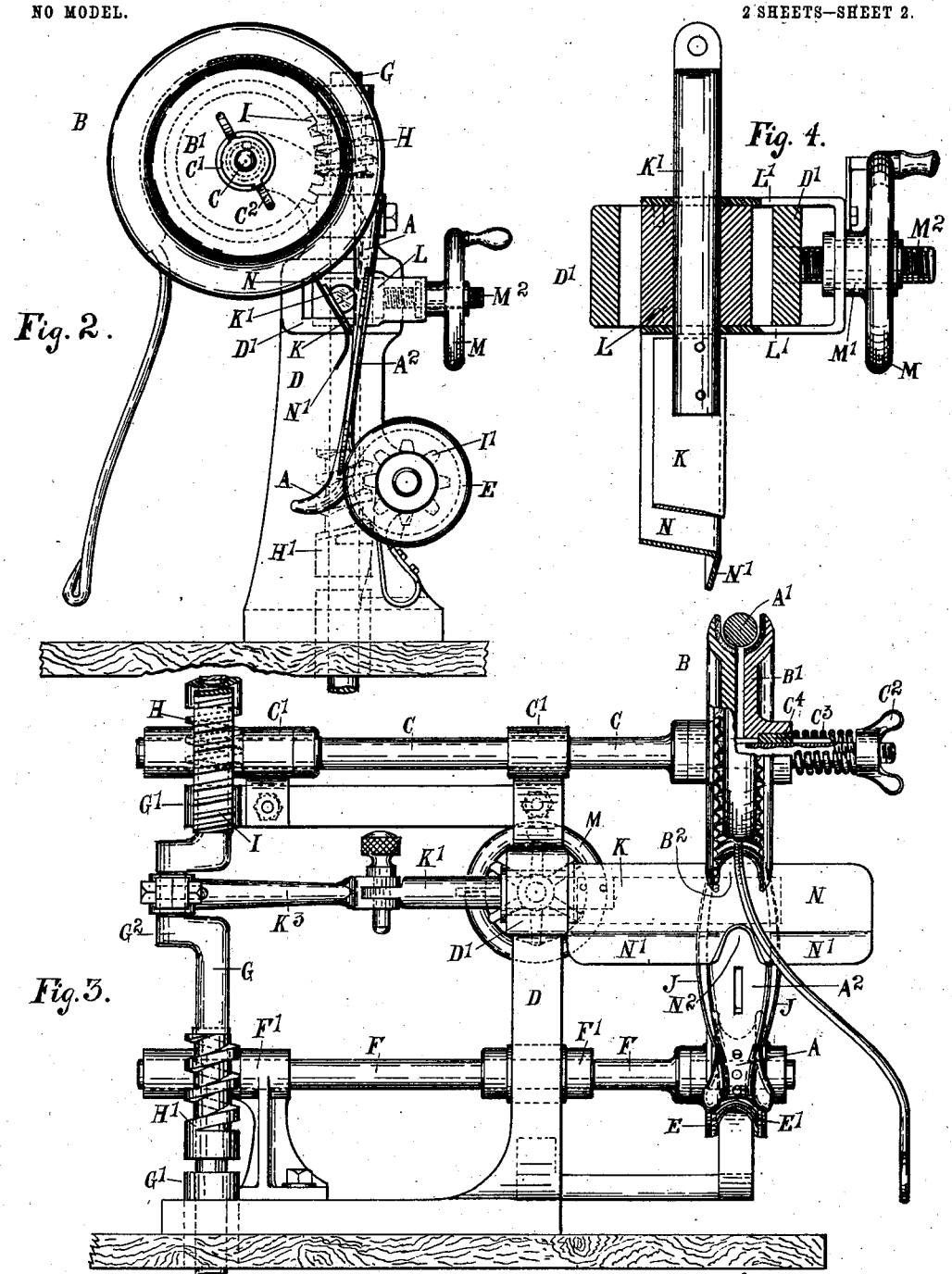

No. 744,712. Patented November 24, 1903.

UNITED STATES PATENT OFFICE.

CHARLES FREDERICK AUGUSTUS BITTERLING, OF NOTTINGHAM, ENGLAND.

APPARATUS FOR DRESSING INTESTINAL SKINS.

SPECIFICATION forming part of Letters Patent No. 744,712, dated November 24, 1903.

Application filed December 13, 1902. Serial No. 135,109. (No model.)

*To all whom it may concern:*

Be it known that I, CHARLES FREDERICK AUGUSTUS BITTERLING, a subject of the King of Great Britain, and a resident of Nottingham, England, have invented certain new and useful Improvements in Apparatus for Dressing Intestinal Skins, of which the following is a specification.

This invention relates to apparatus for cutting the fat off intestinal skins of the kind in which the skin is drawn over a curved stick or device supported by grooved rollers, which latter are rotated to draw the skin over the stick.

Referring to the drawings, Figure 1 is a perspective view, Fig. 2 a front elevation, and Fig. 3 a side elevation, partly in section, of apparatus constructed according to my invention. Fig. 4 is a sectional plan showing the adjusting mechanism of the knife and knife-guard.

Like letters indicate like parts throughout the drawings.

According to this invention the upper end $A'$ of the stick or device A, over which the skin to be dressed is drawn, is curved, so as to extend more than half-way round a roller B, which latter is provided with a groove $B^2$ to receive the said part of the stick.

The roller B is divided in its plane of rotation, preferably along the middle of the groove $B^2$, and the outer part $B'$ is made detachable, so that the curved stick or device A can be removed.

The inner or main part of the roller B is secured on a shaft C, carried in bearings $C'$, attached to or formed in the vertical framing D, while the outer part $B'$ is mounted on the said shaft and is held up to the fixed part by a nut $C^2$ on the end of the shaft and a spring $C^3$ (see Fig. 3) interposed between said nut and the part $B'$. The part $B'$ may also be connected to the shaft C by a spline $C^4$ in the one part engaging with a keyway in the other part.

Owing to the curved upper part $A'$ of the stick A extending more than half-way round the roller B, as described, it is held firmly and cannot become detached from the latter, and it is only necessary with this arrangement to provide means for preventing the stick from moving round with the roller B and maintaining it in one position. For this purpose a second grooved roller E is placed below the roller B on the reverse or outer side of the stick A, and the lower end of the latter is pressed into the groove $E'$ in the roller E when the roller B is rotated in the proper direction, as indicated in Fig. 1. This roller E is mounted on shaft F, carried in bearings $F'$, one of which latter is formed in the vertical framing D and the other secured to its base.

Both the rollers B and E are rotated at the requisite surface velocity, one in the reverse direction to the other, by means of a vertical crank-shaft G, carried in bearings $G'$, one formed in the base of the vertical framing D and the other attached to said framing. On this shaft are two worms H H', the former, H, of which engages with a worm-wheel I on the shaft C, while the latter, H', engages with a worm-wheel I' on the shaft F.

The stick or device A is solely supported by the two rollers B and E, and by rotating said rollers an intestinal skin to be dressed is drawn or fed over the stick A at a constant velocity. The grooves in the rollers may in order to make this action more positive be lined with india-rubber corrugated transversely.

The vertical crank-shaft G is provided with a preferably cone-pulley $G^3$ (see Fig. 1) to receive a driving-belt, so that the speed of the apparatus may be readily varied to suit variations in the skins.

The stick or device A is flattened at $A^2$ and is at this point provided with side springs J to distend the skin and cause it to lie evenly on the flat surface $A^2$ of the stick.

The knife K, which is situated, with its cutting edge, on the inner side and near the flat part $A^2$ of the stick, is preferably straight and is reciprocated longitudinally and at right angles to the stick. The inner end of this knife is secured to a bar $K'$, sliding in an opening in a block L, which latter is adjustable in guideways $D'$, formed in the framing D, so that the cutting edge of the knife may be adjusted relatively to the flat surface $A^2$ on the stick.

The block L (see Fig. 4) is connected to the two free ends of a bent strap $L'$, the outer end of which engages with the boss M' of a hand-wheel M, mounted on a screw M², attached to the end of the guideways D', and the position of the knife K relatively to the stick is adjusted by rotating the said hand-wheel. The knife is reciprocated by means of a crank G² in the crank-shaft G, which crank is connected to the end of the bar K' by a connecting-rod K³.

At the back of the knife K is a combined guard and guide plate N, the inner end of which is secured to the block L, so that it is adjusted with the knife. This plate N serves both to support the knife and lead the fat on the skin up to the knife as the latter is fed over the stick and throw the latter off the knife as it is severed from the skin.

In order to lead the fat on the skin up to the knife, the lower part N' of the plate N is bent at an angle to the main part and is formed with a gap N² (see Fig. 3) of approximately triangular shape to admit the fat on the skin. The sides of this gap N² are adapted to engage with the fat on the skin and lead it up to a central point, where the edge of the knife crosses the gap, and it is thus cut off with certainty, the sides of the gap N² preventing any lateral movement of the fat against the cutting action of the knife, while the upper part of the guard-plate is always interposed between the severed fat and the knife and prevents the latter from being clogged.

The action of the curved stick or device A and the supporting-rollers B E, which also act as the feeding mechanism, cause the shorter diameter of an intestinal skin on which the fat is situated to adapt itself to or move onto the inner side or shorter diameter of the curve in the stick where the knife is situated, and it is thus removed by the latter as the skin is fed forward. The fork or guide provided by extending and forming the knife-guard with a gap N², as hereinbefore described, also assists and finally insures that the fat is led up to a point and held where the knife can sever it from the skin without damage to the latter.

What I claim as my invention, and desire to secure by Letters Patent, is—

1. In apparatus for dressing intestinal skins, the combination of a grooved roller, a stick curved to lie in and extend more than half-way round the groove in said roller, a second roller to engage said stick, means for rotating said rollers, and a knife for severing the fat from a skin as it is drawn over said stick, substantially as described.

2. In apparatus for dressing intestinal skins, the combination of a grooved roller divided in its plane of rotation, a stick curved to lie in and extend more than half-way round the groove in said roller, a second grooved roller, means for rotating said rollers, and a reciprocating knife for severing the fat from a skin as it is drawn over said stick, substantially as described.

3. In apparatus for dressing intestinal skins, the combination of a stick, means for supporting said stick and drawing a skin over it, a knife for severing the fat, and a guide-plate in the angle formed by the stick and knife having a gap leading up to the cutting edge of the said knife so disposed that its sides engage with the fat on a skin passing over the stick and guide said fat to the knife and hold it against the cutting action of the latter, substantially as described.

4. In apparatus for dressing intestinal skins, the combination of a stick, means for supporting said stick and drawing a skin over it, a knife for severing the fat from the skin, and a combined guard and guide plate bent to correspond to and fitting in the angle formed by the stick and knife the upper part of which lies along the under side of the knife and forms a guard while the lower part is provided with a gap leading up to the cutting edge of said knife so disposed that its sides engage with the fat on a skin passing over the stick and guide said fat to the knife and hold it against the cutting action of the latter, substantially as described.

5. In apparatus for dressing intestinal skins, the combination of a stick, means for supporting said stick and drawing a skin over it, a knife for severing the fat from the skin, and a stationary guard on the opposite side of the knife to the stick so that it is interposed between the knife and the severed fat, substantially as described.

6. In an apparatus for dressing intestinal skins, the combination of a stick, means for supporting said stick and drawing a skin over it, a reciprocating knife for severing the fat from the skin, a stationary knife-guard on the opposite side of the knife to the stick and serving to support the knife and deflect the severed fat from it, substantially as set forth.

7. In apparatus for dressing intestinal skins, the combination of a grooved roller, a stick curved to lie in and extend more than half-way round the groove in said roller, a second roller to engage said stick, means for rotating said rollers, a reciprocating knife for severing the fat from the skin, and a knife-guard having in its lower edge an opening to admit the fat, to lead it up to the knife, and to hold it while it is severed, said knife-guard being situated on the opposite side of the knife to the stick, substantially as described.

In testimony whereof I hereunto affix my signature in the presence of two witnesses.

CHARLES FREDERICK AUGUSTUS BITTERLING.

Witnesses:
F. C. SHELDON,
J. B. JAMSON.